Sept. 2, 1924.
J. P. DEVLIN
1,507,048
ELEVATOR FOR PUMP RODS
Filed June 4, 1924
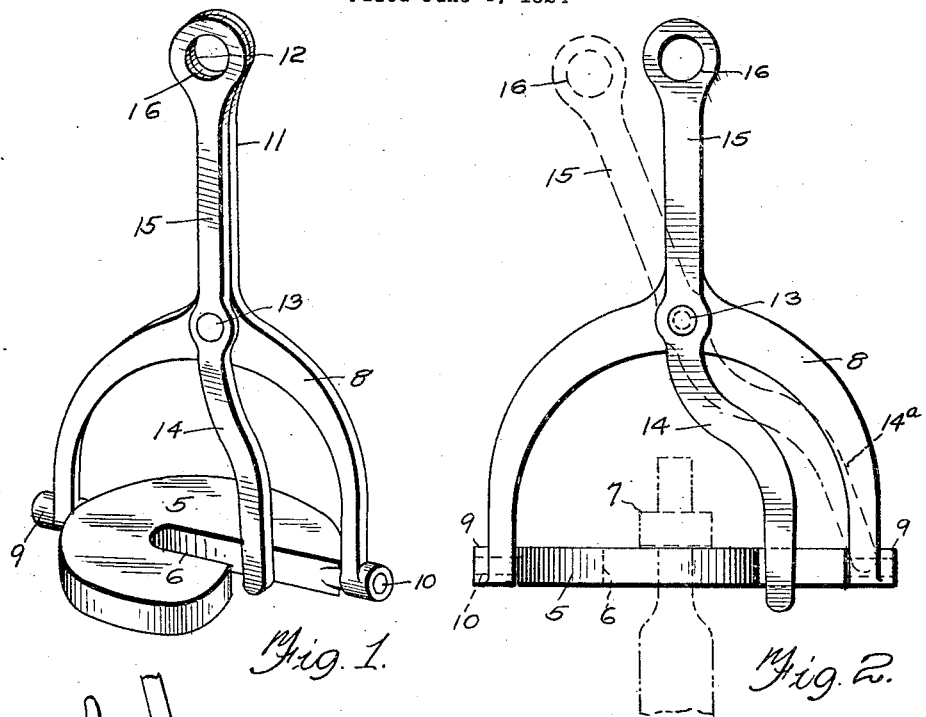
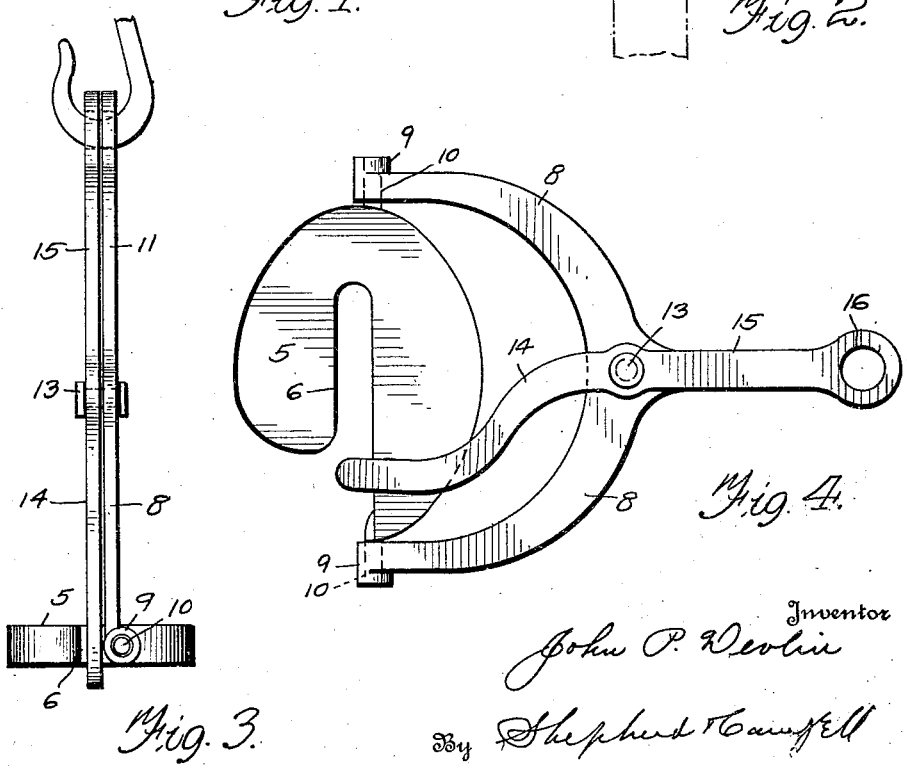

Patented Sept. 2, 1924.

1,507,048

UNITED STATES PATENT OFFICE.

JOHN PAUL DEVLIN, OF DALLAS CITY, PENNSYLVANIA.

ELEVATOR FOR PUMP RODS.

Application filed June 4, 1924. Serial No. 717,827.

*To all whom it may concern:*

Be it known that JOHN PAUL DEVLIN, citizen of the United States, residing at Dallas City, in the county of McKean and State of Pennsylvania, has invented certain new and useful Improvements in Elevators for Pumps Rods, of which the following is a specification, reference being had therein to the accompanying drawings.

This invention relates to a pump rod elevator and it has for its object to provide an improved device of this character constructed in such manner that the pump rod cannot by any means become disengaged from the elevator until the hoisting tackle is removed.

Much property damage has been caused and many persons have been killed and injured by a pump rod becoming accidentally disengaged from its hoisting means.

Further objects and advantages of the invention will be set forth in the detailed specification which follows. In the accompanying drawings:

Figure 1 is a perspective view of an elevator or grapple for pump rods having the invention applied thereto, Figure 2 is a side view of the structure shown in Figure 1, Figure 3 is an end view of the structure, and Figure 4 is a plan view with the bail of the elevator swung downwardly into substantial parallelism with the plate.

Like numerals designate corresponding parts in all of the figures of the drawings. In the drawings 5 designates a segmental plate which is slotted at 6 in a usual and well-known way to engage about the squared or angular part of a regular pump rod underneath the usual collar indicated in dotted lines at 7 in Fig. 2. A bail 8 is pivoted to the plate 5 at 10 and has an upstanding shank 11 which is provided with an eyelet 12, said eyelet receiving the hook of the hoisting tackle by which the elevator and consequently the pump rod may be lifted. So far as described the structure is well known in the art.

When engaging the plate with the angular portion of the pump rod the bail 8 is swung downwardly into substantial parallelism with the plate 5. The plate is then slipped into engagement with the pump rod beneath the collar, and then, when a pull is imparted to the hoisting tackle, the bail is elevated and lies in the position illustrated in Figures 1, 2 and 3, or the bail may be elevated before the hoisting tackle is connected thereto.

It is also common in the art to provide a finger carried by the bail which finger lies in front of the mouth of the slot 6 when the bail is in an elevated position but which does not lie in front of the mouth of the slot when the bail is in a depressed position, the purpose of this finger being to guard against the accidental displacement of the pump rod from the slot.

According to the present invention I provide an element which will lie in front of the mouth of the slot whether the bail be raised or lowered and which cannot be moved out of such guarding position unless the hoisting grip be wholly removed from the eye 12.

To that end I pivot upon the bail 8, at 13, a finger 14 which is of such length that its lower end will lie in the mouth of the slot whenever its shank 15 is in alignment with, or in approximate alignment, with the shank 11 of the bail 8. The shank 15 is provided with an eye 16 which is adapted to align with the eye 12 and when these two eyes are brought into alignment and the hook of the hoisting tackle is passed therethrough it is manifest that the pump rod cannot in any way get out of the slot 6.

During the time that the device is being engaged with the pump rod the finger 14 may be moved to the dotted line position illustrated at 14ᵃ in Fig. 2 and may be swung back to its guarding position as soon as the elevator is engaged with the pump rod.

From the foregoing description, it will be seen that simple and efficient means are herein provided for preventing the accidental dislodgement of the pump rod from an elevator under all circumstances of use. However, it is to be understood that the invention is not limited to the precise construction set forth but that it includes within its purview whatever changes fairly come within either the terms or the spirit of the appended claims.

Having described my invention, what I claim is:

1. A device of the character described comprising a plate, a bail pivoted thereto and having an eye for engagement by an element of the hoisting tackle, and an element pivoted to said bail and likewise having an eye adapted to be engaged by the said element of the hoisting tackle and comprising a part which lies in a guarding position with respect to the plate whenever said eyes are aligned.

2. A device of the character described comprising a segmental slotted plate, a bail pivoted at the opposite sides thereof and having an upstanding shank which terminates in an eye adapted to be engaged by an element of the hoisting tackle, and a finger pivoted to said bail intermediate its ends the upper portion of said finger being provided with an eye which aligns with the first named eye and the lower portion of which lies in guarding position over the mouth of the slot whenever said eyes are aligned with each other.

In testimony whereof I hereunto affix my signature.

JOHN PAUL DEVLIN.